(12) United States Patent
Baccas et al.

(10) Patent No.: US 9,779,433 B2
(45) Date of Patent: Oct. 3, 2017

(54) SYSTEMS AND METHODS FOR DYNAMIC VENDOR AND VENDOR OUTLET CLASSIFICATION

(75) Inventors: Paul Oliver Baccas, Oxford (GB); William James McCourt, Abingdon (GB)

(73) Assignee: Sophos Limited, Abingdon (GB)

( * ) Notice: Subject to any disclaimer, the term of this patent is extended or adjusted under 35 U.S.C. 154(b) by 2072 days.

(21) Appl. No.: 11/689,930

(22) Filed: Mar. 22, 2007

(65) Prior Publication Data

US 2008/0235103 A1   Sep. 25, 2008

(51) Int. Cl.
| | |
|---|---|
| G06Q 10/00 | (2012.01) |
| G06Q 30/06 | (2012.01) |
| G06F 17/30 | (2006.01) |
| H04L 29/06 | (2006.01) |
| G06Q 30/02 | (2012.01) |

(52) U.S. Cl.
CPC ....... G06Q 30/06 (2013.01); G06F 17/30864 (2013.01); G06Q 30/0282 (2013.01); G06Q 30/0609 (2013.01); H04L 63/1483 (2013.01)

(58) Field of Classification Search
USPC ................. 705/1, 26, 27, 1.1, 500
See application file for complete search history.

(56) References Cited

U.S. PATENT DOCUMENTS

| | | | | |
|---|---|---|---|---|
| 7,562,304 B2* | 7/2009 | Dixon et al. | ................... | 715/738 |
| 8,112,403 B2* | 2/2012 | Repasi | .............. | G06F 17/30864 |
| | | | | 705/26.7 |
| 8,214,438 B2* | 7/2012 | Mehr | ...................... | H04L 51/12 |
| | | | | 709/206 |
| 9,654,495 B2* | 5/2017 | Hubbard | ............... | H04L 63/145 |
| 2003/0023878 A1* | 1/2003 | Rosenberg et al. | ........... | 713/201 |

OTHER PUBLICATIONS

Anonymous ("The Credibility Question". PC World; Apr. 2004; 22,4).*

* cited by examiner

*Primary Examiner* — Gabrielle McCormick
(74) *Attorney, Agent, or Firm* — Strategic Patents, P.C.

(57) ABSTRACT

Certain embodiments of the present invention provide methods and systems for dynamic classification of electronic vendors. Certain embodiments provide a method for dynamic vendor classification. The method includes analyzing a vendor based on a comparison of vendor features; categorizing the vendor based on the analysis; and permitting access to the vendor according to the categorization of the vendor. The categorization may include trusted, not trusted, or unsure, for example. Analysis may include comparing a first outlet of the vendor with a second outlet of the vendor, for example. Analysis may include comparing an outlet of the vendor with an outlet of a second vendor, for example. A vendor may be defined as a particular outlet for a vendor and/or all outlets associated with a vendor (a vendor entity).

12 Claims, 3 Drawing Sheets

SYSTEMS AND METHODS FOR DYNAMIC VENDOR AND VENDOR OUTLET CLASSIFICATION

BACKGROUND OF THE INVENTION

The present invention generally relates to electronic vendor and/or outlet classification. More particularly, the present invention relates to dynamic vendor and/or outlet classification based on vendor outlet comparison.

In computing, phishing involves an attempt to fraudulently acquire sensitive information, such as passwords and credit card details, by masquerading as a trustworthy person or business in an electronic communication. Phishing is typically carried out using email or an instant message, although phone contact has been used as well.

Most methods of phishing use some form of technical deception designed to make a link in an email (and the spoofed website to which the link leads) appear to belong to the spoofed organization. Misspelled Uniform Resource Locators (URLs) and/or use of subdomains are common tricks used by phishers, such as http://www.sophas.com or http://www.sophos.example.com, rather than http://www.sophos.com. Another common trick is to make the anchor text for a link appear to be a valid URL when the link actually goes to the phisher's site.

An old method of spoofing links used links containing the @ symbol, originally intended as a way to include a username and password in a web link (contrary to the standard). For example, the link http://www.sophos.com@www.phisher.com/ might deceive a casual observer into believing that the link will open a page on www.sophos.com, whereas the link actually directs the browser to a page on www.phisher.com, using a username of www.sophos.com. The page opens normally, regardless of the username supplied. Such URLs have been disabled in Microsoft's Internet Explorer, while the Mozilla and Opera web browsers have opted to present a warning message and give users the option of continuing to the site or cancelling.

A further problem with URLs has been found in the handling of Internationalized domain names (IDN) in web browsers, that might allow visually identical web addresses to lead to different, possibly malicious, websites. Phishers have taken advantage of a similar risk, using open URL redirectors on the websites of trusted organizations to disguise malicious URLs within a trusted domain.

Once a victim visits a deceptive website the deception is not over. Some phishing scams use JavaScript commands in order to alter a browser address bar. Alteration may be done by placing a picture of a legitimate entity's URL over the address bar or by closing the original address bar and opening a new one containing the legitimate URL.

In another popular method of phishing, an attacker uses a trusted website's own scripts against the victim. Cross-site scripting attacks direct a user to sign in at a bank or other service's own web page, where everything from the web address to the security certificates appears correct. In reality, the link to the website is crafted to carry out the phishing attack, although the phishing link is difficult to spot without specialist knowledge. Additionally, tools, such as a Universal Man-in-the-middle Phishing Kit, provide a simple to use interface that allows a phisher to convincingly reproduce a website and capture any log-in details entered at the fake site.

Pharming is a hacker's attack aiming to redirect a website's traffic to another (bogus) website. Pharming can be conducted by changing a hosts file on a victim's computer or by exploitation of a vulnerability in Domain Name Server (DNS) server software. DNS servers are computers responsible for resolving Internet names into their numerical Internet Protocol (IP) addresses. Compromised DNS servers are sometimes referred to as "poisoned". In recent years both pharming and phishing have been used to steal identity information. Pharming has become of major concern to businesses hosting ecommerce and online banking websites, for example. Antivirus software and spyware removal software cannot protect against pharming.

If a criminal wants to steal someone's account information, he or she can set up a fake website that duplicates a look and feel of a bank or other sensitive website. Phishing may be used to induce victims to divulge sensitive information, such as passwords, PIN numbers or account numbers. However, phishing can be defeated if the victim notices that the Web address or URL does not match the expected name or address. If a criminal hijacks the victim's DNS server and changes the IP address of the target website from its real IP address to the IP address of the fake website, the victim can enter the Web address properly and still be directed to the fake website. While Hypertext Transfer protocol (HTTP) with secure sockets layer (SSL) protection, referred to as HTTPS, helps protect against such pharming, and a user's Web browser may provide a warning about invalid server certificates, such pharming attacks often occur and result in money impact to the victims. Thus, there is a need for improved identification and protection against phishing and pharming attacks.

Page hijacking is a form of spamming an index of a search engine (also known as spamdexing). Page hijacking may be achieved by creating a rogue copy of a popular website which provides contents that are similar to the original site to a web crawler but then redirects web surfers to unrelated or malicious websites. Spammers can use this technique to achieve high rankings in result pages for certain key words. Page hijacking is a form of cloaking, made possible because some web crawlers detect duplicates while indexing web pages. If two pages have the same content, only one of the URLs will be kept. A spammer will try to ensure that the rogue website is the one shown on the result pages.

Detection of fake, rogue and/or otherwise malicious websites is currently being done by human review and simple, automated bots or programs looking at outlet details. Thus, there is a need for systems and methods for improved detection and classification of fake, rogue and/or otherwise malicious websites. There is a need for dynamic detection and classification of malicious vendor outlets and malicious vendors providing one or more outlets to a customer.

BRIEF SUMMARY OF THE INVENTION

Certain embodiments of the present invention provide methods and systems for dynamic classification of electronic vendors and/or vendor outlets (referred to jointly herein as dynamic vendor classification).

Certain embodiments provide a method for dynamic vendor classification. The method includes analyzing a vendor based on a comparison of vendor features; categorizing the vendor based on the analysis; and permitting access to the vendor according to the categorizing of the vendor. Categorization of the vendor may include trusted, not trusted, or unsure, for example. Analysis may include comparing a first outlet of the vendor with a second outlet of the vendor. Analysis may include comparing an outlet of the vendor with an outlet of a second vendor. In certain embodiments, if the analysis of the outlets is the same, a first set of rules may be used to categorize the vendor. If the analysis of the outlets is similar, a second set of rules may be used to categorize the vendor, for example. In certain embodiments, the vendor is defined as an outlet associated with the vendor and/or all outlets associated with the vendor, and the categorizing step then categorizes an outlet associated with the vendor and/or all outlets associated with the vendor based on the analysis.

Certain embodiments provide a dynamic vendor classification system. The system includes a content retriever retrieving electronic vendor data related to a vendor outlet. The system also includes a content analyzer analyzing the electronic vendor data from the content retriever. Additionally, the system includes a content classifier classifying the vendor based on analysis from the content analyzer. In certain embodiments, the vendor includes a vendor entity and/or one or more outlets associated with the vendor entity. In certain embodiments, the content classifier classifies the vendor entity and/or one or more of the outlets associated with the vendor entity based on analysis from the content analyzer. In certain embodiments, the content classifier classifies all outlets associated with the vendor based on an analysis of a particular outlet of the vendor, for example.

Certain embodiments provide a computer readable medium having a set of instructions for execution on a computer. The set of instructions includes a content retrieval routine retrieving electronic vendor data related to a vendor outlet. The set of instructions also includes a content analysis routine analyzing the electronic vendor data from the content retrieval routine. The set of instructions further includes a classification routine classifying at least the vendor outlet based on analysis from the content analysis routine. In certain embodiments, the classification routine may classify a plurality of outlets associated with the vendor based on analysis from the content analysis routine.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

Certain embodiments provide systems and methods for classification of potential vendor outlets. Certain embodiments help to identify less legitimate and/or less trustworthy vendor outlets and vendors that are similar to their own and/or other vendor outlets and/or vendors, for example. For example, certain embodiments help to identify "spamvertised" websites, or websites used by spammers that are similar to another Web site from the same or a different spam campaign. Certain embodiments help prevent fraudulent activities, such as phishing (e.g., attempting to fraudulently acquire sensitive information, such as passwords and credit card details, by masquerading as a trustworthy person or business in an electronic communication) and pharming (e.g., imitating a legitimate website to fraudulently acquire sensitive personal information). Certain embodiments help prevent mass spams relating to outlets based on the same templates, for example.

A Dynamic Vendor Classification (DVC) system is a system for dynamically classifying electronic communication. Classification may include classifying an electronic communication as trusted, not trusted or to be placed in a gray zone, for example. The DVC system may classify a vendor as an entity, a particular outlet (e.g., website or other electronic representation) of the vendor, and/or all outlets associated with the vendor, for example. The DVC system may be configured to operate on multiple levels. The DVC system may be interconnected to other systems to provide greater exposure to electronic communication.

As used herein, a Node is an individual instance of a DVC. A Vendor is an individual or a group of individuals (e.g. business, charities, government agencies, education, community forums, etc.) using electronic communication for possibly nefarious purposes. An Outlet is an electronic shop front, for example, a website, that a Vendor makes available on a network. An Outlet may also be a medium, such as a website, by which a Vendor provides information. A Notification is an electronic communication of and/or related to a Vendor. As used herein, a Vendor refers to an individual or group of individuals engaged in electronic communication as well as Outlet(s) and/or Notification(s) associated with that Vendor. A Customer is one or more individuals with whom a Vendor wishes to interact. Congruent indicates that two or more Vendor Outlets are the same when normalized. Similar indicates that two or more Vendor Outlets are made up largely of the same components. Thus, similar outlets are not congruent.

In certain embodiments, Outlets may be normalized in a variety of ways. For example, webpage A and webpage B may be rendered and virtual screen shots taken of the rendered pages. Image comparison technology may be used to visually compare the screen shots to help determine congruency or similarity, for example. A variety of malware technology may alternatively and/or in addition be used to normalize and compare Outlets, for example. For example, hypertext markup language (HTML) tags may be stripped from webpage A and webpage B, and the DVC may then examine encoded content in webpages A and B for comparison. As another example, the DVC may examine tags within HTML documents, such as two webpages, to determine whether the two pages are referencing the same items (e.g., are the tags referencing the same internal and/or external locations).

Within a node, for example, one customer may receive notification from two, seemingly different vendors. In one scenario, Customer 1 receives a notification of a potential Vendor 1. The notification may come from Vendor 1 and/or from a third party independent of Vendor 1, for example. The DVC then analyzes data from an outlet that Vendor 1 presents to Customer 1. The DVC transforms the data into a unique form and stores the data. Customer 1 then receives a notification of another potential Vendor 2. The DVC analyzes Vendor 2. Then the DVC compares data gleaned from Vendor 2 with data already stored, such as data stored for Vendor 1.

For example, various factors may be used to determine whether data is congruent, such as data size, data components, number of data components, DNS/whois data, etc. Similar data may include similar/same properties, such as a title, text, etc., but different number of data components, for example. In an embodiment, a rule-based system with weighting may be used to compare data. For example, if two Vendors' outlets are less than 40% the same, then the Vendors' outlets are classified as Different. If the two Vendors' outlets are more than 60% the same, then the Vendors' outlets are classified as Similar. If the two Vendors' outlets are more than 90% the same, then the Vendors' outlets are classified as Congruent.

The DVC compares data from Vendor 1 outlet and Vendor 2 outlet to determine a classification of Vendor 2 outlet. For example, if Vendor 1 outlet and Vendor 2 outlet are congruent, then the DVC uses a set of rules to determine whether Vendor 2 outlet is to be trusted, not to be trusted, or placed in a grey zone. If Vendor 1 outlet and Vendor 2 outlet are similar, then the DVC uses a second set of rules to determine whether Vendor 2 outlet is to be trusted, not to be trusted, or placed in a grey zone based on the similarity.

For example, a set of rules may include title and Whois comparisons to classify a vendor outlet. For example, if the title of a suspect vendor outlet is the same as the title of a known good outlet and Whois registration data for the suspect vendor outlet is not the same as Whois registration data for the known good outlet, then the suspect vendor outlet is classified as not to be trusted. Treatment of an untrusted outlet/vendor may vary depending on a context or environment in which the vendor is found. For example, access to an untrusted website may be blocked. Access to a website may be granted but the machine may be placed in a different network access control (NAC) group, for example. As other examples, the webpage may be rendered as an image, as a stripped HTML document, etc.

In another scenario, two or more customers receive notification from two or more seemingly different vendors. For example, Customer 3 receives a notification of a potential Vendor 3 outlet. The DVC then analyzes data that the Vendor 3 outlet presents to Customer 3. The DVC transforms the data into a unique form and stores the data.

Customer 4 receives a notification of a potential Vendor 4. The DVC analyzes data from Vendor 4 outlet. Then, the DVC compares data gleaned from Vendor 4 with data already stored, such as data from Vendor 3.

The DVC compares data from Vendor 3 and Vendor 4, for example, to determine a classification of Vendor 4 outlet. For example, if Vendor 3 outlet and Vendor 4 outlet are congruent, then the DVC uses a set of rules to determine whether Vendor 4 outlet is to be trusted, not to be trusted, or placed in a grey zone. If Vendor 3 outlet and Vendor 4 outlet are similar, then the DVC uses a second set of rules to determine whether Vendor 4 outlet is to be trusted, not to be trusted, or placed in a grey zone based on the similarity.

In another scenario, a customer receives a notification from Vendor 1, outlet 1 and a notification from Vendor 1, outlet 2. Data from outlets 1 and 2 are analyzed and compared to determine a classification of Vendor 1 and/or outlets 1 and 2. For example, if outlet 1 and outlet 2 are congruent, then the DVC uses a set of rules to determine whether Vendor 1 and/or outlets 1 and 2 are to be trusted, not to be trusted, or placed in a grey zone. If outlet 1 and outlet 2 are similar, then the DVC uses a second set of rules to determine whether Vendor 1 and/or outlets 1 and 2 are to be trusted, not to be trusted, or placed in a grey zone based on the similarity.

Additionally, in certain embodiments, the DVC may be used to classify Vendors' outlets with information gleaned from within and/or outside of a Node. In certain embodiments, data on trusted and/or not trusted vendors' outlets can be exchanged between nodes. Thus, a DVC may analyze either of the scenarios discussed above for a single customer within a node, for example.

In certain embodiments, nodes can communicate directly with each other and/or other with an external system, such as SophosLabs, for rules, trusted, not trusted and/or other information sharing, for example. An external system, such as SophosLabs, may periodically update other nodes of a DVC with data regarding vendors' outlets, for example. In certain embodiments, an external system, such as SophosLabs, may provide an initial seeding of trusted and untrusted vendors and/or vendor websites, for example.

In certain embodiments, a DVC can be executed via an external system, such as SophosLabs, at a customer site, and/or at an interested third party (e.g., an Internet Service Provider (ISP), search engine vendor, etc.). In certain embodiments, each node of the DVC adds its own computing resources as well as its own electronic communications to the DVC. Each node brings to the DVC its own traffic and vendors. Each node uses vendor classification to protect it and other nodes, for example.

In certain embodiments, rules and/or vendor outlet analysis may include a signature analysis, hashing, checksum, malware patterns, virus and/or other malware definitions, gene information, information as classifications based on groupings of genes, etc. Malware or unsafe or unwanted content may be detected in a variety of ways, such as by comparing checksum of a file to a stored checksum value, pattern matching to identify known patterns in files, electronic mail and/or disk areas (e.g., boot sectors), emulating all or part of a file's code to try and detect malware, such as polymorphic viruses, which may reveal themselves during execution, and/or extracting and analyzing functionality from a file by matching genes and/or classifications defined from groupings of genes, e.g., PHENOTYPE™ classifications (PHENOTYPE™ is a trademark of the assignee of the present patent application). Pattern matching and other forms of detection may be performed using Virus Identity Files (IDEs) or other identity files that contain algorithms describing various characteristics of a virus and/or other malware or unsafe or unwanted content for use in recognition.

In certain embodiments, malware or unsafe or unwanted content may be classified without requiring a most up-to-date set of definitions and/or signatures. A file and/or functionality within a file may be classified as malicious, non-malicious, suspicious, unsafe, unwanted, etc., based on functionality and/or relationships between or combinations of functionality, for example. Alternatively and/or in addition, particular programs represented by and/or included in the file may be identified.

Figure 1:
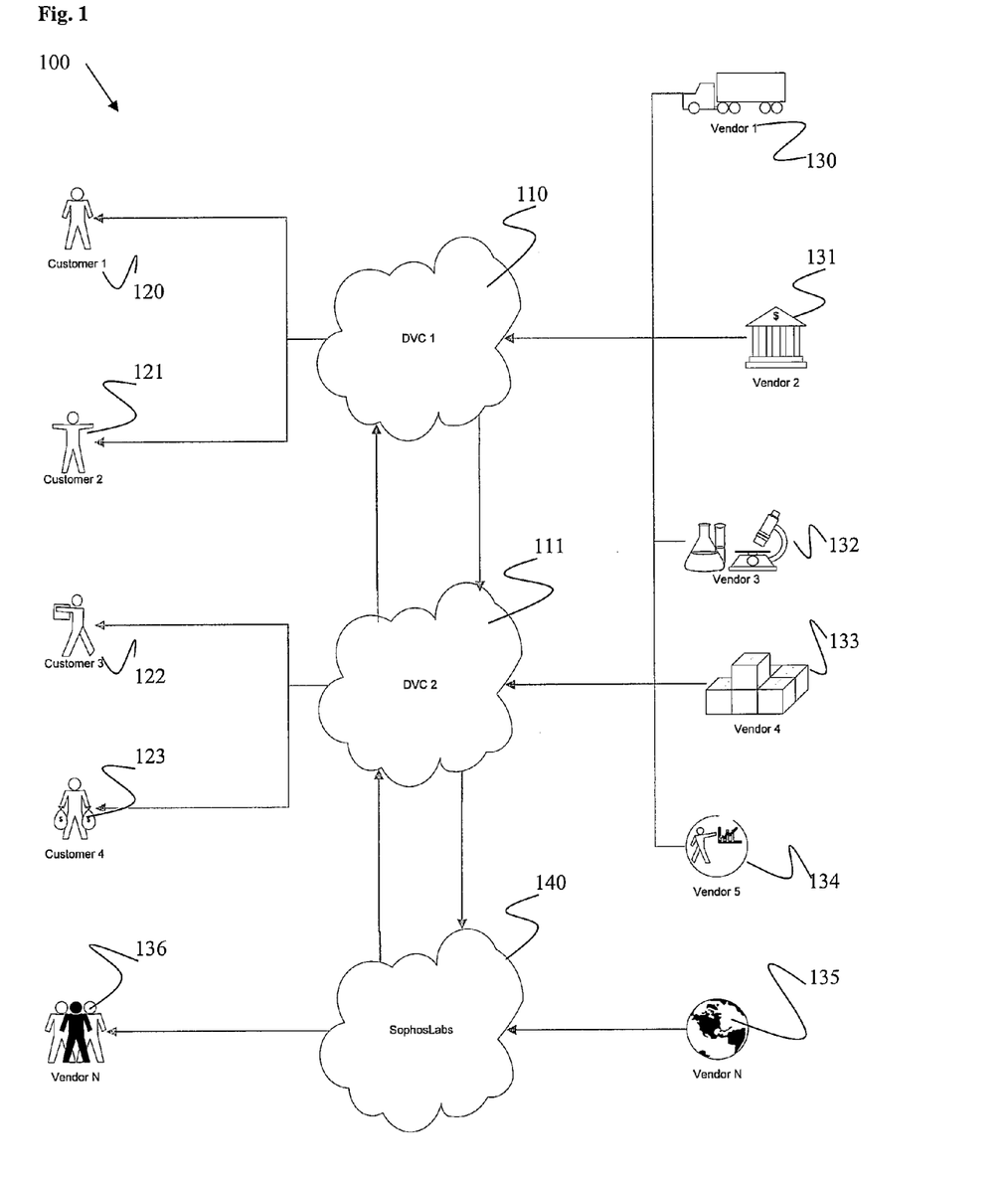
FIG. 1 illustrates a dynamic vendor classification (DVC) system in accordance with an embodiment of the present invention.

FIG. 1 illustrates a dynamic vendor classification (DVC) system 100 in accordance with an embodiment of the present invention. The system 100 includes dynamic vendor classification modules (DVCs) 110 and 111, Customers 120, 121, 122 and 123, Vendors 130, 131, 132, 133, 134, 135 and 136, and external system 140, for example.

One or more DVCs 110-111 may serve as an interface between one or more Customers 120-123 and one or more Vendors 130-136 and/or electronic vendor outlets (e.g., Web sites). When a Vendor 130-136 communicates with a Customer 120-123 and/or a Customer 120-123 attempts to access a Vendor outlet, a DVC 110-111 applies one or more rules and/or other criteria to determine whether the Vendor outlet 130-136 should be trusted.

Based on trust, levels of access may be denied or other action taken. For example, if the DVC 110-111 determines that the Vendor outlet 130-136 is to be trusted, access to the Vendor outlet 130-136 by the Customer 120-123 is allowed. If the DVC 110-111 determines that the Vendor outlet 130-136 is not be trusted, access by the Customer 120-123 to the Vendor outlet and/or all outlets associated with the Vendor 130-136 may be denied. Alternatively and/or in addition, the Customer 120-123 may be warned or otherwise alerted about the Vendor, a particular Vendor outlet and/or all outlets associated with the Vendor 130-136. In an embodiment, if analysis of one Vendor outlet results in a classification of the outlet as untrustworthy or questionable, then all outlets associated with that Vendor may receive the same classification, for example. If the DVC 110-111 is unable to determine whether the Vendor outlet 130-136 should be trusted, the Vendor outlet 130-136 may be flagged and/or otherwise monitored (e.g., placed in a grey zone) to gather additional information for a trust analysis. For example, interactions with a flagged Vendor outlet 130-136 may be restricted and/or more closely monitored than interactions with a trusted Vendor outlet 130-136 until the DVC 110-111 determines whether the Vendor outlet 130-136 should be listed as trusted or not trusted. In determining whether a Vendor 130-136 should be trusted, the DVC 110-111 may receive information from an external system, such as an anti-malware and/or anti-virus provider (e.g., SophosLabs).

A trust analysis may involve a comparison of one or more features of a Vendor 130-136 outlet, for example. For example, a Vendor 130-136 outlet may be compared to one or more other Vendor outlets to determine whether the Vendor 130-136 should be trusted. Multiple Vendors' outlets 130-136 may be compared for a single Customer 120-123, a single Vendor outlet 130-136 may be compared across multiple Customers 120-123 and/or multiple Vendors' outlets 130-136 may be compared across multiple Customers 120-123, for example. Comparison may involve normalization of outlet components prior to the comparison. If the vendor outlets are the same, a certain set of rules may be applied to determine trustworthiness of the Vendor outlet 130-136. If the vendor outlets are similar (e.g., include some of the same components), then a different (e.g., larger) set of rules may be applied in a trust analysis of the Vendor outlet 130-136 in question.

Components of system 100 may be implemented in software, hardware and/or firmware, for example. For example, one or more components of the system 100 may be implemented as a set of instructions stored on a computer readable medium for execution on a computer. The components of system 100 may be implemented separately and/or implemented in a variety of combinations. Components of system 100 may be implemented on a single computer system for processing software, data, and messages. Alternatively, components of system 100 may be implemented in a distributed network where different processes occur on different machines with a communication network to allow sharing of information. System 100 may be implemented using one or more software programs.

Figure 2:
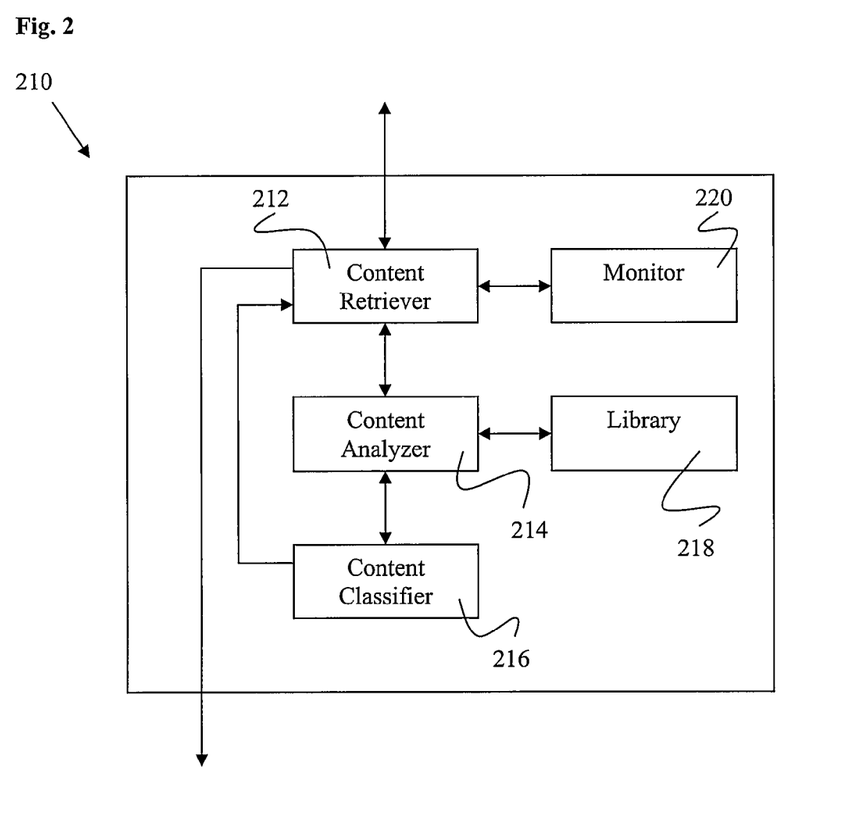
FIG. 2 illustrates a dynamic vendor classification module in accordance with an embodiment of the present invention.

As shown in FIG. 2, a DVC, such as DVC 210 may include a content retriever 212, a content analyzer 214, and a content classifier 216. In certain embodiments the DVC 210 may also include a library 218. In operation, the content retriever 212 retrieves electronic data related to a Web site and/or other electronic vendor outlet. The content analyzer 214 receives the electronic data from the content retriever 212 and analyzes the data. For example, the data is compared to other data for the vendor obtained from the same and/or other customer. Analysis may be performed according to one or more sets of rules, depending upon similarity of the retrieved electronic data to other content. Other data and/or rules may be stored in the library 218, for example. Based on the analysis, the content classifier 216 associates the vendor content with a designation of trusted, not trusted, or unsure, for example. In certain embodiments, additional levels of distinction may be used. If analysis indicates that the DVC 210 is unsure about the trustworthiness of the vendor, the content retriever 212 and/or a monitor 220 may be used to monitor the vendor to determine a level of trust, for example.

Components of system 200 may be implemented in software, hardware and/or firmware, for example. For example, one or more components of the system 200 may be implemented as a set of instructions stored on a computer readable medium for execution on a computer. The components of system 200 may be implemented separately and/or implemented in a variety of combinations. Components of system 200 may be implemented on a single computer system for processing software, data, and messages. Alternatively, components of system 200 may be implemented in a distributed network where different processes occur on different machines with a communication network to allow sharing of information. System 200 may be implemented using one or more software programs.

Figure 3:
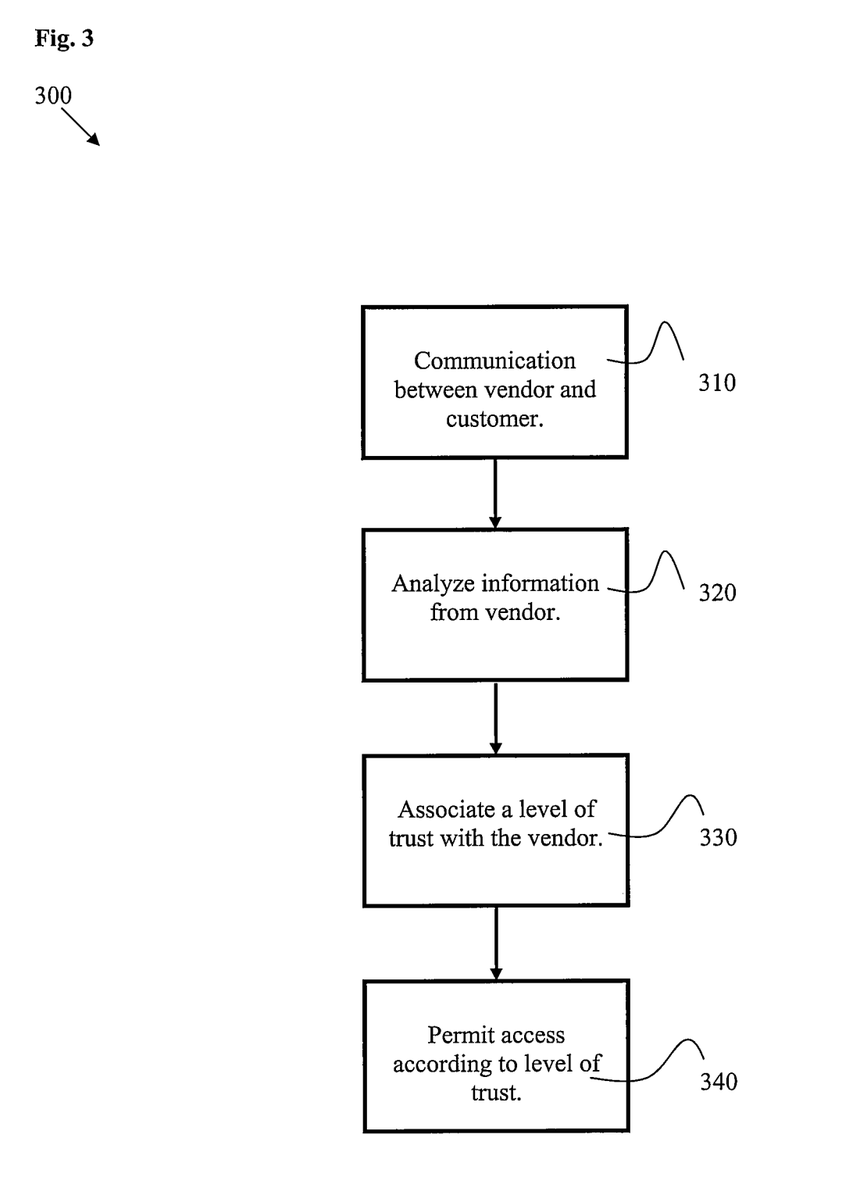
FIG. 3 illustrates a flow diagram for a method for dynamic vendor classification in accordance with an embodiment of the present invention.

FIG. 3 illustrates a flow diagram for a method 300 for dynamic vendor and/or vendor outlet classification in accordance with an embodiment of the present invention. At step 310, a vendor communicates with a customer. For example, a customer receives an electronic mail regarding a vendor Web site.

At step 320, information from the vendor and/or vendor outlet is analyzed. A trust analysis may involve a comparison of one or more features of a vendor outlet or electronic storefront, for example. A vendor outlet may be compared to one or more other outlets of the same and/or different vendor(s), for example. Customer experience across vendors and/or vendor experience among different customers may be compared to determine whether the vendor and/or vendor outlet should be trusted. Comparison may involve normalization of outlet components prior to the comparison. If the vendor outlets are the same, a certain set of rules may be applied to determine trustworthiness of the vendor. If the vendor outlets are similar (e.g., include some of the same components), then a different (e.g., larger) set of rules may be applied in a trust analysis of the vendor outlet in question.

At step 330, a level of trust and/or other categorization is associated with the vendor and/or vendor outlet. For example, based on analysis, the vendor outlet may be classified as trusted. Alternatively, the vendor outlet may be classified as not trusted. Further, if the analysis was unable to satisfactorily determine trust, the vendor outlet may be placed on a gray or watch list, delaying a determination of trust, for example.

At step 340, access to the vendor outlet is permitted according to the level of trust associated with the vendor outlet. For example, if the vendor outlet is classified as a trusted vendor outlet, then access to the vendor outlet by a customer is allowed. If the vendor outlet is classified as an untrusted vendor outlet, then access to the vendor outlet may be denied or restricted. If vendor outlet classification is indeterminate, the vendor and/or vendor outlet may be placed in a gray zone and/or otherwise monitored to further evaluate trustworthiness.

One or more of the steps of the method 300 may be implemented alone or in combination in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device.

Certain embodiments of the present invention may omit one or more of these steps and/or perform the steps in a different order than the order listed. For example, some steps may not be performed in certain embodiments of the present invention. As a further example, certain steps may be performed in a different temporal order, including simultaneously, than listed above.

As an example, Website 1 is a well-known North American bank. Website 1 is trusted because SophosLabs has seeded initial data regarding Website 1. Website 2 is similar but not congruent to Website 1. Rules are executed to analyze Website 1 and Website 2. For example, a domain is hosting Website 2 in Asia but Website 2 is in English and WHOIS registry information is inconclusive. Website 2 is then categorized as not trusted. Another Website 3 is identified and determined to be congruent to Website 2. Thus, Website 3 is classified as not trusted. Website 4 is analyzed and determined to be similar to Website 2 but not congruent. However, Website 4 is congruent to Website 1. Thus, Website 4 is deemed to be trusted. For example, Website 4 may be the Hong Kong branch of the North American bank.

Thus, certain embodiments provide systems and methods for dynamic vendor and/or vendor outlet classification. Certain embodiments compare vendor outlets or electronic storefronts to identify similarities and/or differences for use in a trust analysis. Certain embodiments help improve trust or reliability analysis of vendor websites prior to access by a user. Certain embodiments identify websites and/or underlying vendors that may be associated with malware or unsafe or unwanted content and therefore need to be investigated. Certain embodiments provide dynamic classification of one or more vendor outlets and/or entire vendors based on analysis and comparison of outlet content. Thus, as used herein, vendor is intended to be inclusive of both the vendor as an entity and particular outlet(s) (e.g., website(s)) associated with that vendor.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method for dynamic vendor classification, said method comprising:
receiving website content from each of a plurality of websites at a dynamic vendor classification system, wherein the website content represents at least a portion of the plurality of websites' construction, forming a plurality of website content;
normalizing the plurality of website content based upon hypertext markup language tags, encoded content, and a visual comparison of screen shots for each one of the plurality of website content, thereby providing normalized content;
analyzing the normalized content using a processor based on a congruence analysis to identify content as congruent when the normalized content is the same, and a similarity analysis to identify content as similar when the normalized content is made up of substantially the same components but is not more than 90% the same;
identifying a vendor for each of the plurality of websites by comparing the categorized websites to stored data for known vendors;
receiving a request from a customer to access one of the plurality of websites at a dynamic vendor classification module of the dynamic vendor classification system;
determining whether a vendor of the one of the plurality of websites is trusted, not trusted, or uncertain using a first set of rules when the one of the plurality of websites is congruent to a second one of the plurality of websites and a second set of rules when the one of the plurality of websites is similar to the second one of the plurality of websites, wherein the second set of rules for similar websites includes at least one rule for evaluating WHOIS registry information; and
controlling access to the one of the plurality of websites by the customer based upon whether the vendor is trusted, not trusted, or uncertain.

2. The method of claim 1, further comprising permitting access to said vendor according to whether said vendor is trusted, not trusted, or uncertain.

3. The method of claim 1, wherein said analyzing step further comprises comparing an outlet of said vendor with an outlet of a second vendor.

4. The method of claim 1, wherein said controlling step includes controlling access to all outlets associated with said vendor based on an analysis of a particular outlet of said vendor.

5. The method of claim 1, wherein analyzing the normalized content using the processor includes determining, based on data size, data components, number of data components, and Domain Name Server (DNS) data, whether content is congruent.

6. The method of claim 1, wherein analyzing the normalized content using the processor includes determining, based on different number of data components, whether content is similar.

7. A set of instructions for execution on a computer and embodied in a non-transitory computer-readable medium, the set of instructions comprising code that performs the steps of:
receiving website content from each of a plurality of websites at a dynamic vendor classification system, wherein the website content represents at least a portion of the plurality of websites' construction, forming a plurality of website content;
normalizing the plurality of website content based upon one or more of hypertext markup language tags, encoded content, and a visual comparison of screen shots for each one of the plurality of website content, thereby providing normalized content;
analyzing the normalized content using a processor based on a congruence analysis to identify content as congruent when the normalized content is the same, and a similarity analysis to identify content as similar when the normalized content is made up of substantially the same content but is not more than 90% the same;

identifying a vendor for each of the plurality of websites by comparing the categorized websites to stored data for known vendors;

receiving a request from a customer to access one of the plurality of websites at a dynamic vendor classification module of the dynamic vendor classification system;

determining whether a vendor of the one of the plurality of websites is trusted, not trusted, or uncertain using a first set of rules when the one of the plurality of websites is congruent to a second one of the plurality of websites and a second set of rules when the one of the plurality of websites is similar to the second one of the plurality of websites, wherein the second set of rules for similar websites includes at least one rule for evaluating WHOIS registry information; and controlling access to the one of the plurality of websites by the customer based upon whether the vendor is trusted, not trusted, or uncertain.

8. The set of instructions of claim 7, wherein the vendor comprises at least one of an outlet associated with the vendor and all outlets associated with the vendor and wherein the controlling step further comprises controlling access to at least one of an outlet associated with the vendor and all outlets associated with the vendor based on the analysis.

9. The set of instructions of claim 7, wherein the analyzing step further comprises comparing a first outlet of the vendor with a second outlet of the vendor.

10. The set of instructions of claim 7, wherein the analyzing step further comprises comparing an outlet of the vendor with an outlet of a second vendor.

11. The set of instructions of claim 7, wherein analyzing the normalized content using the processor includes determining, based on data size, data components, number of data components, and Domain Name Server (DNS) data, whether content is congruent.

12. The set of instructions of claim 7, wherein analyzing the normalized content using the processor includes determining, based on different number of data components, whether content is similar.

* * * * *

UNITED STATES PATENT AND TRADEMARK OFFICE
CERTIFICATE OF CORRECTION

PATENT NO. : 9,779,433 B2
APPLICATION NO. : 11/689930
DATED : October 3, 2017
INVENTOR(S) : Paul Oliver Baccas and William James McCourt Page 1 of 1

It is certified that error appears in the above-identified patent and that said Letters Patent is hereby corrected as shown below:

In the Claims

In Column 10, Line 11, Claim 1, delete "the categorized websites" and insert -- the websites --.

In Column 11, Line 2, Claim 7, delete "the categorized websites" and insert -- the websites --.

Signed and Sealed this
Ninth Day of January, 2018

Joseph Matal
*Performing the Functions and Duties of the*
*Under Secretary of Commerce for Intellectual Property and*
*Director of the United States Patent and Trademark Office*